United States Patent [19]
Nishida et al.

[11] Patent Number: 5,614,814
[45] Date of Patent: Mar. 25, 1997

[54] NEGATIVE VOLTAGE GENARATING CIRCUIT

[75] Inventors: Masao Nishida, Sakai; Takayoshi Higashino, Neyagawa; Yasoo Harada, Hirakata, all of Japan

[73] Assignee: Sanyo Electric Co., Ltd., Osaka, Japan

[21] Appl. No.: 365,462

[22] Filed: Dec. 28, 1994

[30] Foreign Application Priority Data

Dec. 28, 1993 [JP] Japan ................................. 5-337335

[51] Int. Cl.⁶ .................................................. H02M 3/18
[52] U.S. Cl. ............................................................ 323/313
[58] Field of Search ........................ 363/59–60; 367/110; 320/1; 365/265; 323/311–314, 267–269, 282, 272; 327/530–532

[56] References Cited

U.S. PATENT DOCUMENTS

| | | | |
|---|---|---|---|
| 4,890,620 | 12/1989 | Bird | 307/571 |
| 4,929,884 | 5/1990 | Bird et al. | 323/313 |
| 5,196,996 | 3/1993 | Oh | 363/60 |
| 5,216,588 | 6/1993 | Bajwa et al. | 363/60 |
| 5,301,097 | 4/1994 | McDaniel | 363/60 |
| 5,357,416 | 10/1994 | Kitano et al. | 363/60 |

OTHER PUBLICATIONS

P. Bradshaw, "Applications of the ICL7660—a CMOS High Efficiency Voltage Converter", Southcon/81 Conference Record, pp. 10–3/1–7, 1981.
S.L. Black, "555 as switching regulator supplies negative voltage", Electronics, p. 101, May 15, 1975.

*Primary Examiner*—Aditya Krishnan
*Attorney, Agent, or Firm*—Armstrong, Westerman, Hattori, McLeland & Naughton

[57] ABSTRACT

A negative voltage generating circuit includes an oscillating unit constructed of a ring oscillator for outputting a pulse signal with a high frequency and a polarity inverting unit in which the pulse signal is inputted to charge negative voltage. This negative voltage generating circuit is miniaturized and outputs a stable negative voltage. Further, the negative voltage to be outputted can be controlled by varying a resistance value through a control of an FET in a voltage controlling unit.

14 Claims, 7 Drawing Sheets

NEGATIVE VOLTAGE GENARATING CIRCUIT

BACKGROUND OF THE INVENTION

1. Field of the Invention

The present invention relates to a negative voltage generating circuit. A personal handy phone system (PHS) requires a power amplifier that consumes only a small electric power. Therefore, the power amplifier is constructed of a GaAs metal schottky field effect transistor (GaAs MESFET), which requires to be supplied with negative voltage. The present invention is used for such a purpose, for example, and provides a negative generating circuit that can be built in a chip together with the power amplifier.

2. Description of Related Art

A power amplifier constructed of a GaAs MESFET is required to be applied with positive voltage at the drain thereof and with negative voltage at the gate thereof. Therefore, a chip with such a power amplifier built-in is used by being connected to both a positive power supply and a negative power supply.

In order to obtain negative voltage by supplying positive voltage, a charging pump type DC—DC converter is used. The charging pump type DC—DC converter has four switches, two capacitors and one crystal oscillator. Switching FETs are generally used as the switches, and the crystal oscillator is connected to the capacitor having a large capacity.

When the chip containing the power amplifier constructed of the GaAs MESFET is used, the chip is connected to a positive power supply and a negative power supply comprising the charging pump type DC—DC converter.

The oscillation frequency of the oscillator in the charging pump type DC—DC converter is as low as approximately 10 kHz (= 1/100 µsec). Because of the low oscillation frequency, a ripple is caused in the output voltage of the DC—DC converter, and hence, it is impossible to obtain a stable negative voltage. In order to stabilize the negative voltage, an inverting capacitor and a smoothing capacitor having large capacities are required. Moreover, since the oscillation frequency is low, a switching operation takes a long time, and hence, it takes a disadvantageously long time from the start of the switching operation until the negative voltage is stabilized. As still another problem, since the capacitors having large capacities are required, the size of the negative power supply becomes large.

SUMMARY OF THE INVENTION

The present invention was devised to solve the aforementioned problems, and the objective is providing a negative voltage generating circuit that outputs a stable negative voltage and is miniaturized in the size and the weight.

The negative voltage generating circuit of this invention comprises an oscillating unit constructed of a ring oscillator including an FET and a capacitor for outputting a pulse signal with a high frequency and a polarity inverting unit constructed of a charging pump including an FET, an inverting capacitor and a smoothing capacitor. The polarity inverting unit is directly connected to the oscillating unit so as to receive the pulse signal, thereby charging the smoothing capacitor with negative voltage, which is to be outputted.

Accordingly, when the ring oscillator is actuated, the pulse signal with an extremely high frequency is generated, thereby charging the smoothing capacitor with negative voltage. As a result, a stable negative voltage is outputted.

The negative voltage generating circuit of this invention further comprises a voltage controlling unit including a control FET and receiving the negative voltage from the polarity inverting unit and controlling the negative voltage to be outputted.

Accordingly, the control FET in the voltage controlling unit is supplied with a control signal, thereby varying a combined resistance value. The negative voltage to be outputted is obtained in accordance with the thus varied combined resistance value.

Further, the ring oscillator includes a plurality of direct coupled FET logic (DCFL) inverters and each of the DCFL inverters has a capacitor for providing the oscillation frequency. As a result, the frequency of the pulse signal outputted by the oscillating unit is determined in accordance with the capacity of this capacitor.

Furthermore, the polarity inverting unit has a diode connected in parallel to the smoothing capacitor. As a result, the negative voltage charging the smoothing capacitor can be stabilized.

Further, the length of a conductor connecting the oscillating unit to the polarity inverting unit is not more than one tenth of the product of the velocity of light and the period of the pulse signal outputted from the oscillating unit. As a result, there is no need to consider the effect of reflection on the conductor.

Further, in the voltage controlling unit, a series circuit of a first FET and a first diode is connected to a portion between a positive power supply and the positive electrode of the smoothing capacitor, and a series circuit of the control FET, a second diode and a second FET is connected to a portion between the positive power supply and the negative electrode of the smoothing capacitor. As a result, a voltage decrease is caused by the internal resistances of the first and second diodes and the currents flowing through the first and second FETs. The negative voltage is outputted by generating the decreased voltage, the voltage supplied by the power supply and the charging voltage of the smoothing capacitor.

Furthermore, the first and second diodes have equal electric characteristics, and the first and second FETs have equal electric characteristics.

The above and further objects and features of the invention will more fully be apparent from the following detailed description with accompanying drawings.

DESCRIPTION OF THE PREFERRED EMBODIMENTS

The present invention will now be described referring to the accompanying drawings illustrating the embodiments thereof.

Figure 1:
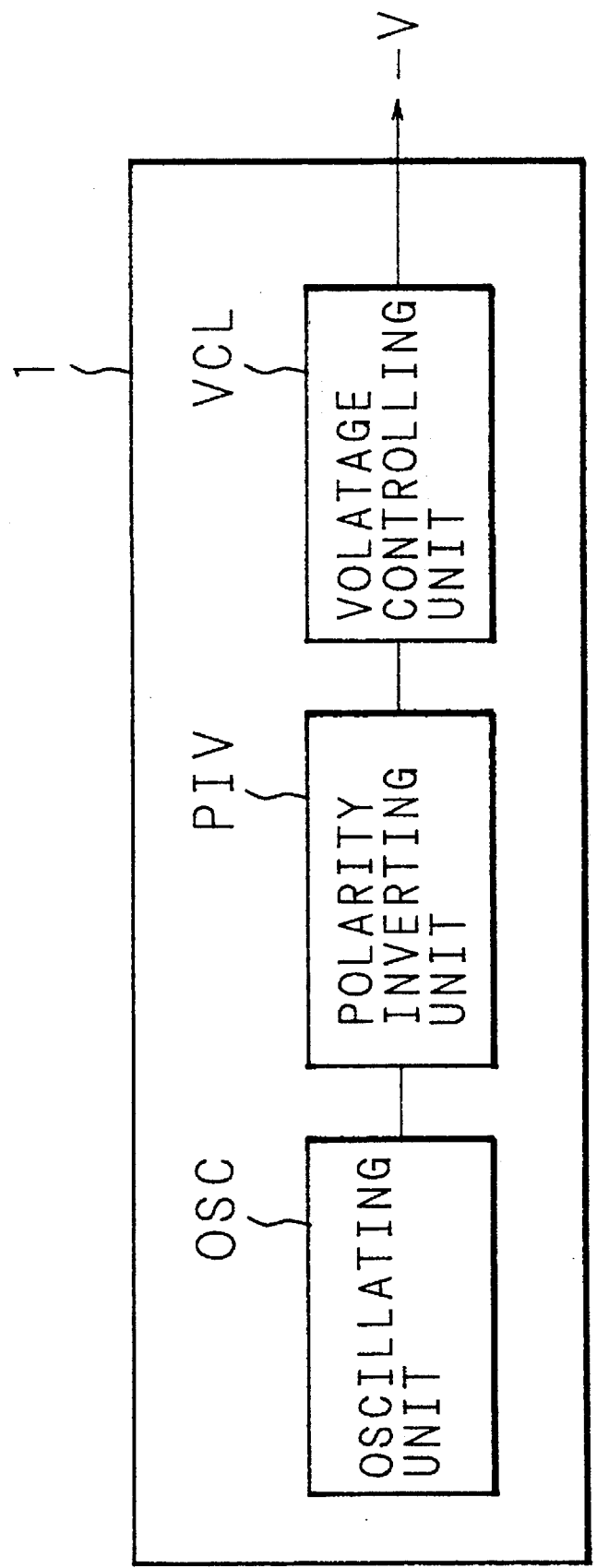
FIG. 1 is a diagram showing the schematic configuration of a negative voltage generating circuit according to the invention.

FIG. 1 is a block diagram showing the configuration of a negative voltage generating circuit according to the invention. The negative voltage generating circuit 1 comprises an oscillating unit OSC, a charging current adjusting unit IVR and a polarity inverting unit PIV to which a pulse signal outputted by the oscillating unit is supplied, and a voltage controlling unit VCL to which negative voltage generated by the polarity inverting unit PIV is supplied so as to control negative voltage.

Figure 2:
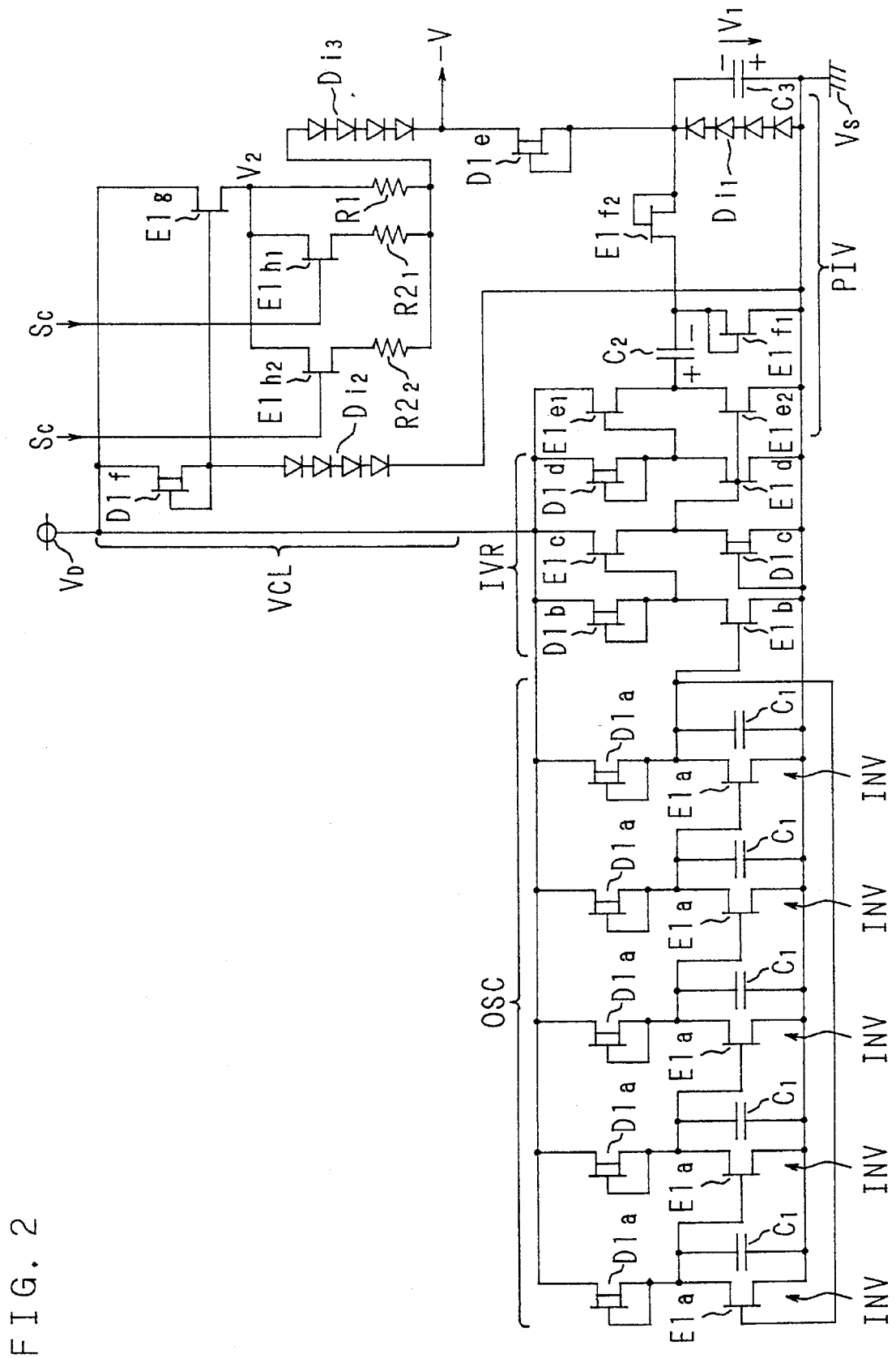
FIG. 2 is a circuit diagram of the negative voltage generating circuit of the invention.

FIG. 2 is a block diagram showing the configuration of an actual circuits in the negative voltage generating circuit of the invention. In a ring oscillator, which works as the oscillating unit OSC, an FET D1a having a gate width of 5 μm and operated in a depletion mode is connected in series to an FET E1a having a gate width of 10 μm and operated in an enhancement mode. The FET E1a is connected in parallel to an oscillating capacitor $C_1$, thereby forming DCFL inverter INV. The ring oscillator includes a ring node of five sets of such a DCFL inverter INV. One terminal of each FET D1a that is not connected to the FET E1a is connected to a power supply $V_D$, and one terminal of each FET E1a that is not connected to the FET D1a is connected to a ground potential $V_S$, in each of the DCFL inverter INV.

Figure 3:
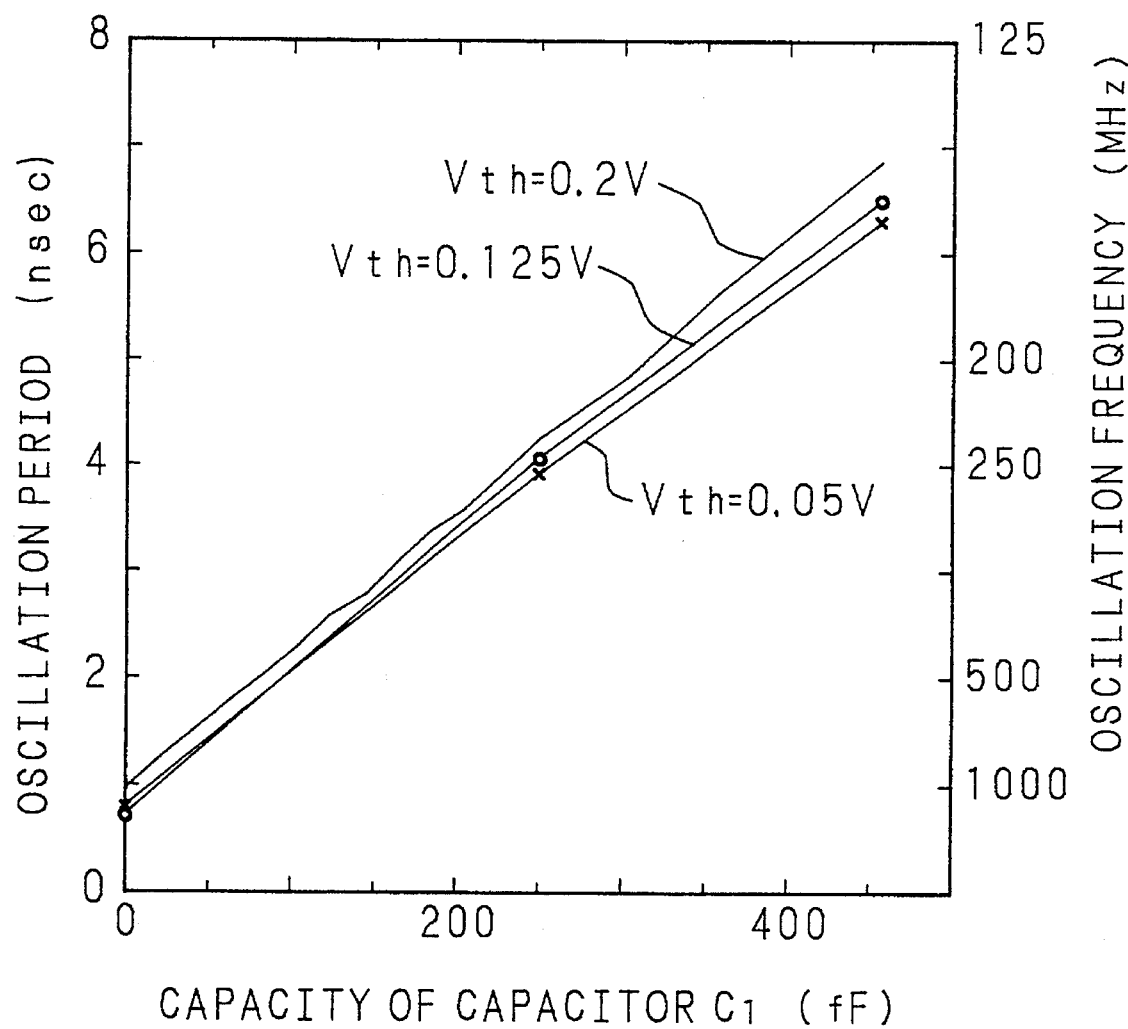
FIG. 3 is a graph showing the relationship between the capacity of a capacitor and the oscillation frequency in the embodiment.

The ring oscillator is operated so as to satisfy the relationship as is shown in FIG. 3. FIG. 3 is a graph showing the relationship between the capacity of the capacitor $C_1$ and the oscillation frequency of the ring oscillator, wherein the vertical axis indicates the oscillation frequency (MHz) and the oscillation period (nsec), and the horizontal axis indicates the capacity (fF) of the capacitor $C_1$. In this graph, the threshold voltage $V_{th}$ of the FET E1a is used as a parameter. It is understood from this graph that the oscillation frequency depends upon the capacity of the capacitor $C_1$ regardless of the threshold voltage $V_{th}$ of the FET E1a. Therefore, when an oscillation frequency of, for example, 250 MHz, is desired, the capacity of the capacitor $C_1$ is 250 fF. The capacity of the capacitor $C_1$ is herein thus selected to be 250 fF. The capacitor $C_1$ is connected in parallel to each FET E1a so as to determine the oscillation frequency of the ring oscillator, thereby forming each DCFL inverter INV.

The charging current adjusting unit IVR shown in FIG. 2 includes a series circuit of an FET D1b operated in the depletion mode and an FET E1b operated in the enhancement mode, a series circuit of an FET E1c operated in the enhancement mode and an FET D1c operated in the depletion mode, and a series circuit of an FET D1d operated in the depletion mode and an FET E1d operated in the enhancement mode, and the respective series circuits are connected in parallel.

The node between the FET D1b and the FET E1b is connected to the gate of the FET E1c, and the node between the FET E1c and the FET D1c is connected to the gate of the FET E1d. The FET D1d and the FET E1d are connected in series to each other. One terminal of each of the FET D1b, the FET E1c and the FET D1d that is not connected to each of the FET E1b, the FET D1c and the FET E1d is connected to the power supply $V_D$. One terminal of each of the FET E1b, the FET D1c and the FET E1d that is not connected to each of the FET D1b, the FET E1c and the FET D1d is connected to the ground potential $V_S$. The gate widths of the FET E1b, the FET E1c, the FET E1d, the FET D1b, the FET D1c, and the FET D1d are determined so as to satisfy the following condition: the gate width of each of the FET E1b and the FET D1b < that of each of the FET E1c and the FET D1c < that of each of the FET E1d and the FET D1d. Therefore, a current flowing through the series circuit of the FET E1c and the FET D1c is larger than that flowing through the series circuit of the FET E1b and the FET D1b, and that flowing through the series circuit of the FET E1d and the FET D1d is still larger than that flowing through the series circuit of the FET E1c and the FET D1c. The gate of the FET E1b is connected to the node between the FET D1a and the FET E1a of the oscillating unit OSC.

The polarity inverting unit PIV is formed as a charging pump, and includes a series circuit of an FET E1$e_1$ and an FET E1$e_2$ both operated in the enhancement mode, a series circuit, which is connected in parallel to the FET E1$e_2$, of an inverting capacitor $C_2$ and an FET E1$f_1$ operated in the enhancement mode, a series circuit of an FET E1$f_2$ connected to the FET E1$f_1$ and operated in the enhancement mode and four Schottky diodes $D_{i1}$ connected in series to the FET E1$f_2$, and a smoothing capacitor $C_3$ connected in parallel to the Schottky diodes $D_{i1}$. One terminal of the FET E1$e_1$ that is not connected to the FET E1$e_2$ is connected to the power supply $V_D$, and the node among the FET E1$e_2$, the FET E1$f_1$, the anode of the Schottky diodes $D_{i1}$ and the smoothing capacitor $C_3$ is connected to the ground potential $V_S$.

The gate of the FET E1$e_1$ is connected to the node between the FET D1d and the FET E1d of the charging current adjusting unit IVR, and the gate of the FET E1$e_2$ is connected to the gate of the FET E1d. The Schottky diodes $D_{i1}$ are provided to the polarity inverting unit PIV in order to stabilize a voltage $V_1$ at the terminal of the smoothing capacitor $C_3$. In the case where the voltage supplied by the power supply $V_D$ is, for example, 3 V, the terminal of the smoothing capacitor $C_3$ is charged to have the voltage $V_1$ of −3 V, and the voltage $V_1$ is affected by the voltage variation of the power supply $V_D$ and the variation in the characteristics of the other elements in the circuit, if the Schottky Diodes $D_{i1}$ are not provided.

For example, the voltage $V_1$ can be lowered to be 2 V by connecting the smoothing capacitor $C_3$ in parallel to a series circuit in which four Schottky diodes each having a rise voltage of 0.5 V.

It is noted that the objective of the invention can be achieved without the Schottky diodes $D_{i1}$.

The voltage controlling unit VCL includes a series circuit of four Schottky diodes $D_{i2}$ and an FET D1$f$ operated in the depletion mode, disposed between the power supply $V_D$ and the ground potential $V_S$; a series circuit of an FET E1$g$ operated in the enhancement mode, a resistor R1, four Schottky diodes $D_{i3}$ and an FET D1$e$ operated in the depletion mode connected in series to one another, disposed between the power supply $V_D$ and the smoothing capacitor $C_3$ of the polarity inverting unit PIV; a series circuit, which is connected in parallel to the resistor R1, of an FET $E1h_1$ operated in the enhancement mode and a resistor $R2_1$; and a series circuit, which is connected in parallel to the series circuit of the FET $E1h_1$ and the resistor $R2_1$, of an FET $E1h_2$ operated in the enhancement mode and a resistor $R2_2$. The gate of the FET $E1g$ is connected to the node between the FET $D1f$ and the series circuit of the Schottky diodes $D_{i2}$. The FET $D1f$ and the FET $D1e$ are set to have equal electric characteristics.

The gates of the FETs $E1h_1$ and $E1h_2$ are supplied with a voltage control signal $S_C$ for controlling negative voltage −V, which will be described in detail below. The negative voltage −V is outputted from the node between the series circuit of the Schottky diodes $D_{i3}$ and the FET $D1e$. In the voltage controlling unit VCL, the gate of the FET $E1g$ is applied with a constant voltage by the FET $D1f$ and the series circuit of the Schottky diodes $D_{i2}$ so as to apply a stable reference voltage $V_2$ to the node between the FET $E1g$ and the resistor R1. A current flowing through the FET $E1g$ is regulated by the FET $D1e$.

In this embodiment, the combination of the Schottky diodes $D_{i2}$ and the Schottky diodes $D_{i3}$ and the combination of the FET $D1f$ and the FET $D1e$, both the combinations having equal electric characteristics, are used to output a stable negative voltage −V. The invention, however, is not limited to this, and the object of the invention can be attained even when these combinations have different electric characteristics.

When a voltage to be applied to the FET $D1e$ exceeds a saturation voltage (i.e., more than 0.4 V), the excessive voltage is entirely consumed by the FET $D1e$. Accordingly, the negative voltage −V to be outputted by the negative voltage generating circuit is not affected by the variation of the voltage $V_1$ at the terminal of the smoothing capacitor $C_3$. A combined resistance value of the resistance values of the resistors R1, $R2_1$ and $R2_2$ and the active resistance values of the FETs $E1h_1$ and $E1h_2$ is provided. The negative voltage −V to be outputted is obtained by subtracting, from the reference voltage $V_2$, a voltage obtained as a product of the combined resistance value and a current flowing through the FET $D1e$, and a reduced voltage by the Schottky diodes $D_{i3}$. Specifically, the negative voltage −V can be controlled by varying the combined resistance value by changing the combination of the resistors R1, $R2_1$ and $R2_2$ and the active resistances of the FETs $E1h_1$ and $E1h_2$.

The method for forming the aforementioned circuit elements will now be described. The operation layers of the FETs $D1a$, $D1b$, $D1c$, $D1d$, $D1e$ and $D1f$ operated in the depletion mode and the FETs $E1a$, $E1b$, $E1c$, $E1d$, $E1e_1$, $E1e_2$, $E1f_1$, $E1f_2$, $E1g$, $E1h_1$ and $E1h_2$ operated in the enhancement mode are formed by the Si ion implantation under the following conditions:

FETs operated in the depletion mode:

Acceleration voltage: 40 keV

Amount of ion implantation: $5.5 \times 10^{12}$ cm$^{-2}$

FETs operated in the enhancement mode:

Acceleration voltage: 40 keV

Amount of ion implantation: $2.9 \times 10^{12}$ cm$^{-2}$

The Schottky diodes $D_{i1}$, $D_{i2}$ and $D_{i3}$ and the resistors R1, $R2_1$, $R2_2$, are formed under the following conditions:

Schottky diodes:

Acceleration voltage: 40 keV

Amount of ion implantation: $5.5 \times 10^{12}$ cm$^{-2}$

Resistors:

Acceleration voltage: 90 keV

Amount of ion implantation: $5.0 \times 10^{13}$ cm$^{-2}$

Each of the capacitors $C_1$, $C_2$ and $C_3$ is formed in an MIM structure, wherein the dielectric constant of the insulator is about 7 and the thickness thereof is 1600 angstrom. The gate length of each FET operated in the depletion mode is set to be 1.8 μm, and that of each FET operated in the enhancement mode is set to be 0.7 μm.

Now, the operation of the negative voltage generating circuit, having the aforementioned configuration will be described. When the power supply $V_D$ is turned on, the ring oscillator of the oscillating unit OSC is actuated. As a result, a rectangular pulse signal at 250 MHz is outputted as an oscillation signal from the node between the FET $D1a$ and the FET $E1a$ in the fifth DCFL inverter INV to be supplied to the gate of the FET $E1b$ of the charging current adjusting unit IVR. When the pulse signal is at a high level, the FET $E1b$ is turned on, thereby turning off the FETs $E1c$ and $E1d$. Then, from the node between the FETs $D1d$ and $E1d$, a larger current flows through the FET $D1d$ having a larger gate width to reach the gate of the FET $E1e_1$ of the polarity inverting unit PIV. As a result, the FETs $E1e_1$ and $E1f_1$ are turned on and the FETs $E1e_2$ and $E1f_2$ are turned off. In this manner, the inverting capacitor $C_2$ is charged to have the polarities as shown with the signs − and + shown in FIG. 2.

When the pulse signal supplied from the oscillating unit OSC is at a low level, the FET $E1b$ is turned off, thereby turning on the FETs $E1c$ and $E1d$. As a result, the FETs $E1e_1$ and $E1f_1$ are turned off and the FETs $E1e_2$ and $E1f_2$ are turned on in the polarity inverting unit PIV. Then, the smoothing capacitor $C_3$ is charged to have the polarities as shown with the signs − and + shown in FIG. 2 by the charging voltage of the inverting capacitor $C_2$. The smoothing capacitor $C_3$ is thus charged with negative voltage. Such a charging operation by the inverting capacitor $C_2$ is repeated in accordance with the frequency of the pulse signal outputted from the oscillating unit OSC. As a result, the smoothing capacitor $C_3$ is charged with a stable negative voltage having an extremely small ripple.

In the voltage controlling unit VCL, the FET $D1f$ is turned on by the voltage supplied by the power supply $V_D$. Therefore, a constant voltage is supplied to the gate of the FET $E1g$, thereby turning on the FET $E1g$. As a result, the reference voltage $V_2$ is applied to the node between the FET $E1g$ and the resistor R1. At this time, in the case that the smoothing capacitor $C_3$ is charged with the negative voltage at this point, the FET $D1e$, that is, a constant current source, is turned on, resulting in allowing a current to flow through the resistor R1 and the Schottky diodes $D_{i3}$. At this time, in the case that the voltage control signal $S_C$ is not inputted to the gates of the FETs $E1h_1$ and $E1h_2$ at this point, the FETs $E1h_1$ and $E1h_2$ are both off, and hence, the resistance value of the resistor R1 alone is used as the combined resistance value of the resistors R1, $R2_1$ and $R2_2$ and the active resistances of the FETs $E1h_1$ and $E1h_2$.

Accordingly, the voltage obtained as the product of the resistance, combined by the resistor R1 and the internal resistance of the Schottky diodes $D_{i3}$, and the current flowing through the FET $D1e$ is decreased. Therefore, a voltage obtained by subtracting the decreased voltage from the reference voltage $V_2$ is applied to the node between the Schottky diodes $D_{i3}$ and the FET $D1e$, thereby outputting a sum of the voltages as the negative voltage −V. When the voltage control signal $S_C$ is inputted to the gate of the FET $E1h_1$ to turn on the FET $E1h_1$, a total resistance value is the combined resistance value of the resistor R1 and a series circuit of the active resistance of the FET $E1h_1$ and the resistor R2$_1$, connected in parallel to each other. Since the resistance value of the resistor between the FET E1g and the Schottky diodes D$_{i3}$ is thus varied, the decreased voltage to be subtracted from the reference voltage V$_2$ is varied. As a result, the negative voltage −V to be outputted is also varied.

Further, the negative voltage −V can be controlled in accordance with the voltage level of the voltage control signal S$_C$. Moreover, the negative voltage −V can be further finely controlled by finely varying the combined resistance by supplying the voltage control signal S$_C$ also to the gate of the FET E1h$_2$. Since the voltage V$_1$ at the terminal of the smoothing capacitor C$_3$ is stable having no ripple, it is possible to provide a stable negative voltage −V at a desired voltage level in this manner. When the resistors R2$_1$ and R2$_2$ are removed, a constant negative voltage −V is provided.

Figure 4:
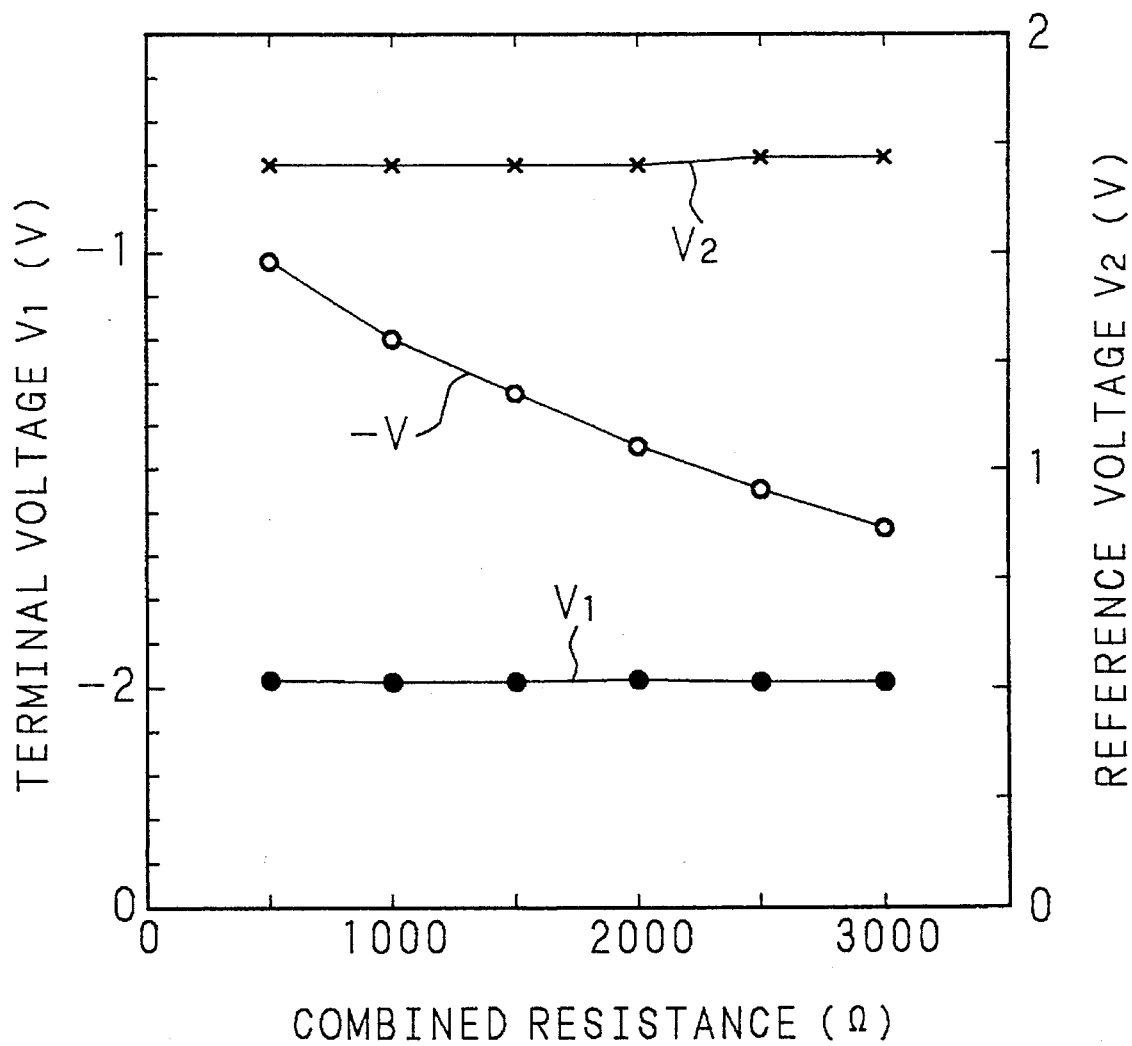
FIG. 4 is a graph showing the variation of negative voltage against a combined resistance value in the embodiment.

Now, the negative voltage −V will be specifically described. It is assumed that the resistors R1 and R2$_1$ have resistance values of 3000 Ω and 600 Ω, respectively, the voltage V$_1$ at the terminal of the smoothing capacitor C$_3$ is −2 V, and the reference voltage V$_2$ applied to the node between the FET E1g and the resistor R1 is 1.6 V. Under this condition, when the voltage of the voltage control signal S$_C$ is varied between 1.75 V and 2.25 V, the obtained negative voltage −V is varied as is shown in FIG. 4, which is a graph showing the relationship among the combined resistance, the terminal voltage and the reference voltage which vary in accordance with the voltage control signal. In this graph, the vertical axis indicates the negative voltage −V, the terminal voltage V$_1$ and the reference voltage V$_2$, and the horizontal axis indicates the combined resistance value.

As the voltage of the voltage control signal S$_C$ is increased, the combined resistance value is decreased and the negative voltage −V is increased. When the voltage level of the voltage control signal S$_C$ is increased from 1.75 V to 2.25 V, it can be confirmed that the negative voltage −V is varied from −1.65 V to −1.0 V.

Figure 5:
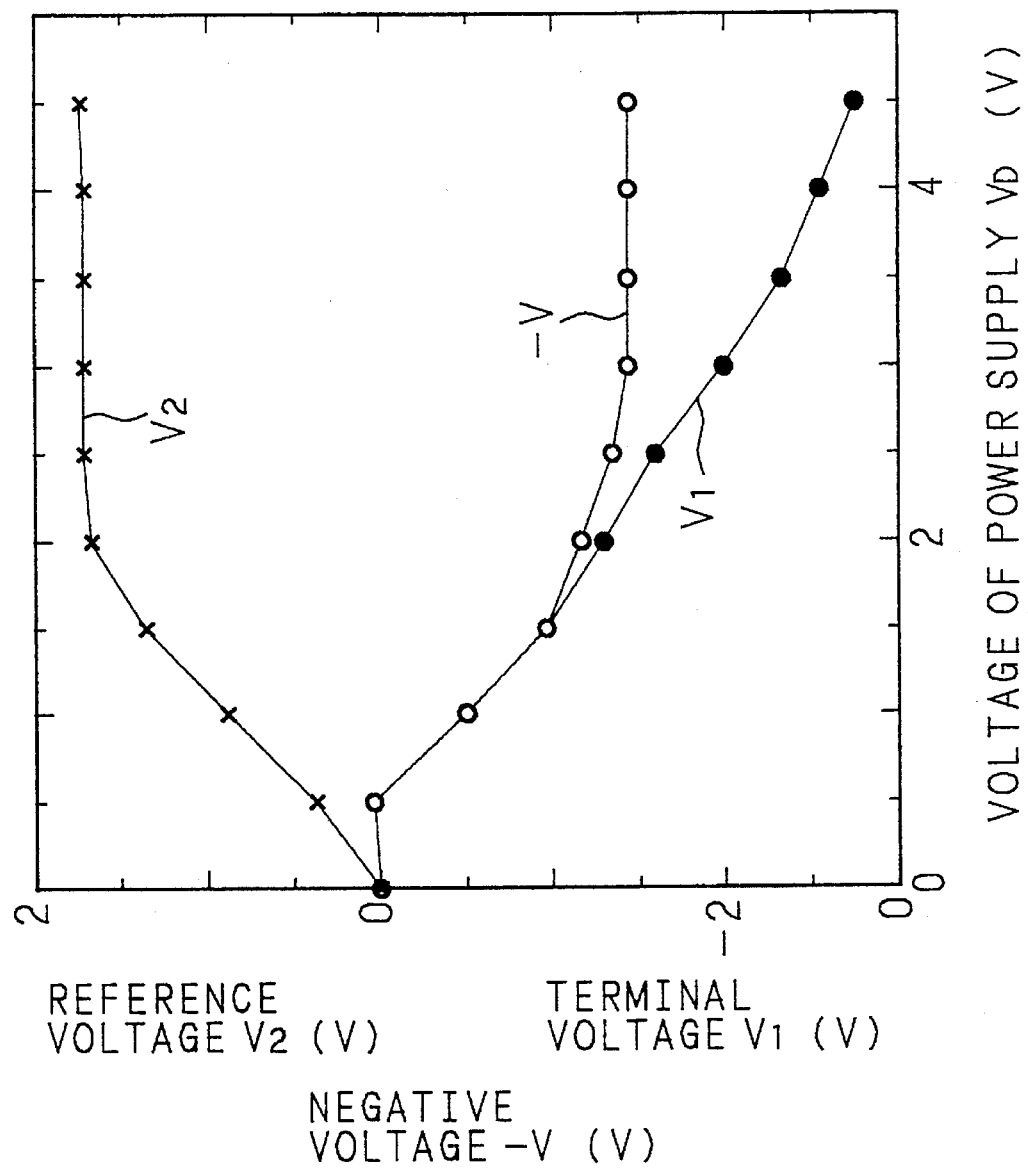
FIG. 5 is a graph showing the variation of the negative voltage against a supply voltage in the embodiment.

Further, when the voltage of the power supply V$_D$ is changed without varying the combined resistance, the negative voltage −V can be controlled as described above. FIG. 5 is a graph showing the relationship among the terminal voltage V$_1$ of the smoothing capacitor C$_3$, the reference voltage V$_2$ and the negative voltage −V measured when the voltage of the power supply V$_D$ is varied. As is apparent from FIG. 5, when the voltage of the power supply V$_D$ is changed from 0 V to 3 V, the negative voltage −V is varied from 0 V to −1.3 V. When the voltage of the power supply V$_D$ is changed from 0 V to 2 V, the reference voltage V$_2$ is varied from 0 V to 1.8 V. Further, when the voltage of the power supply V$_D$ is changed from 0.6 V to 4.5 V, the terminal voltage V$_1$ of the smoothing capacitor C$_3$ is varied from 0 V to −3.7 V. When the voltage of the power supply V$_D$ exceeds 3 V, the negative voltage −V becomes constant regardless of the voltage of the power supply V$_D$ because the FET D1e is saturated.

Figure 6:
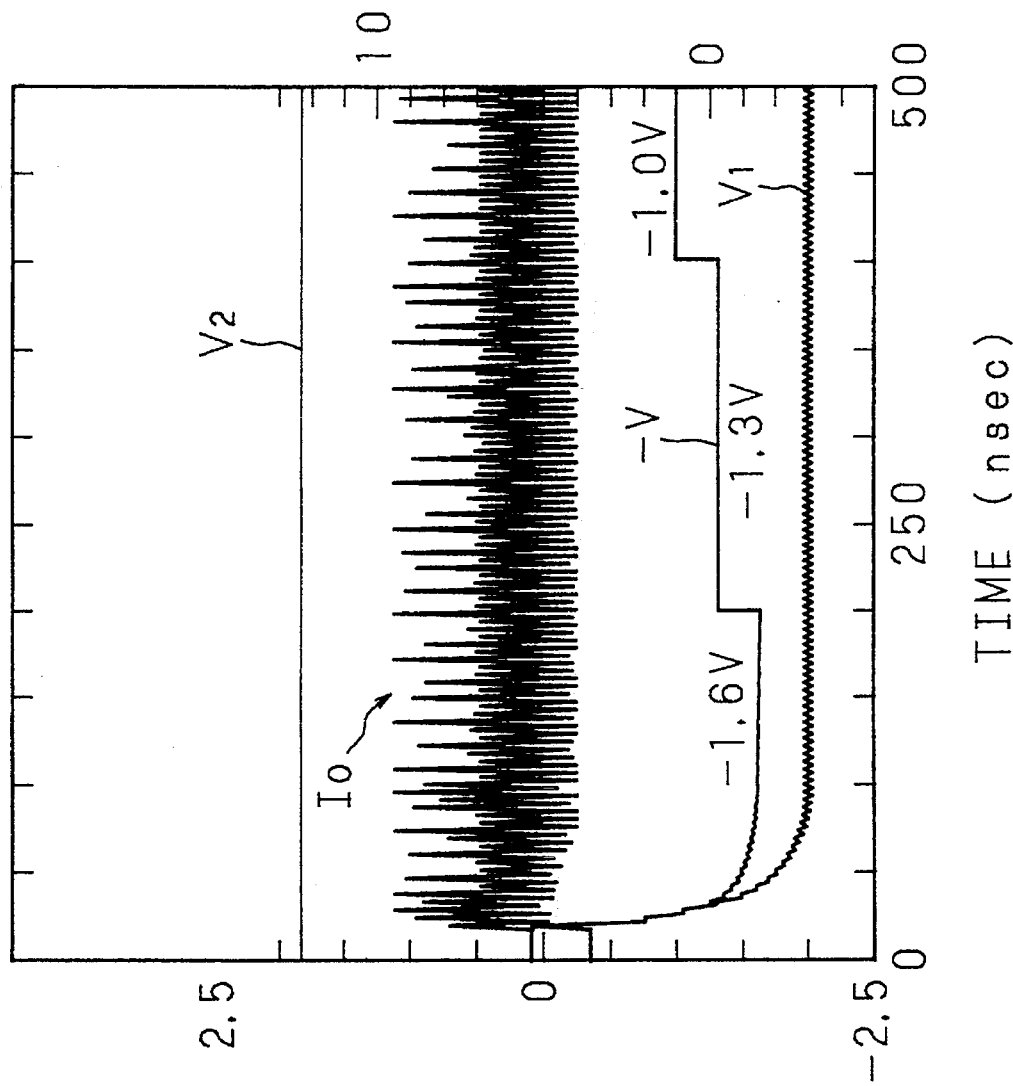
FIG. 6 shows the waveforms of the variation in the negative voltage, a voltage at a terminal of a smoothing capacitor, a reference voltage and a consumed current measured after supplying a power in the embodiment.

FIG. 6 shows the waveforms of the variation in the reference voltage V$_2$, the terminal voltage V$_1$ of the smoothing capacitor C$_3$ and a consumed current, measured after supplying the voltage by the power supply V$_D$. As is apparent from FIG. 6, the terminal voltage V$_1$ of the smoothing capacitor C$_3$ and the negative voltage −V become −2.0 V and −1.6 V, respectively in a time as short as approximately 100 nsec after the start of the voltage supply by the power supply V$_D$. Further, it can be also confirmed that the negative voltage −V is changed without delay when the voltage of the voltage control signal S$_C$ is varied as described above. It can be further confirmed that the consumed current I$_0$ is changed in accordance with the period of the pulse signal outputted by the oscillating unit OSC. In addition, the reference voltage V$_2$ is always constant.

As described above, in the negative voltage generating circuit of the invention, the oscillating unit is constructed of the ring oscillator including a plurality of DCFL inverters using the GaAs MESFET. Accordingly, it is possible to generate a pulse signal with an extremely high frequency by using a capacitor with an extremely small capacity for regulating the oscillation frequency. As a result, the oscillating unit can be miniaturized. Further, because of the miniaturization of the oscillating unit, the distance of the node between the oscillating unit and the polarity inverting unit becomes short. Therefore, there is no need to consider the effect of reflection on a transmission line, and hence, a conventionally used resistor for matching can be omitted. For example, when the length of the transmission line between the oscillating unit and the polarity inverting unit is not more than one tenth of the product of the velocity of light and the period of the pulse signal outputted from the oscillating unit, the effect of the reflection on the transmission line can be ignored. As a result, the negative voltage generating circuit can be further miniaturized and the output voltage thereof can be further stabilized.

Moreover, electric loss can be decreased in such a negative voltage generating circuit because of the short transmission line.

Furthermore, in the polarity inverting unit constructed of the charging pump, the GaAs MESFET is turned on/off in accordance with the period of the purse signal outputted by the oscillating unit so as to charge the inverting capacitor and the smoothing capacitor. Accordingly, it is possible to use capacitors with extremely small capacities as the inverting capacitor and the smoothing capacitor, resulting in miniaturizing the polarity inverting unit as well. In addition, the charging voltage can be stabilized because no ripple is caused in the terminal voltage of such a capacitor.

Further, in the voltage controlling unit using the GaAs MESFET and the resistor, the combined resistance value for varying the negative voltage is varied by controlling the GaAs MESFET, resulting in also miniaturizing the voltage controlling unit. Accordingly, by combining these miniaturized units, the resultant negative voltage generating circuit can be extremely miniaturized, and such a miniaturized generating circuit can be built in a chip with ease.

Figure 7A:
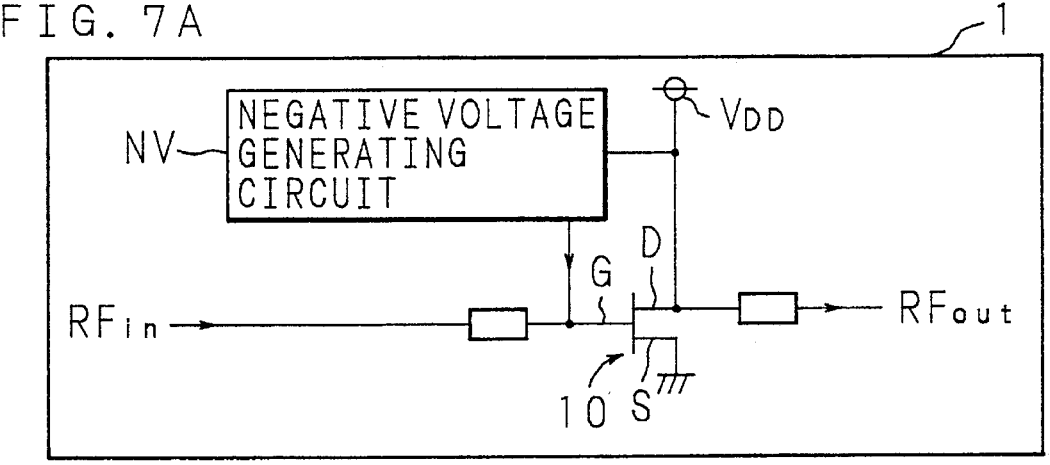
FIG. 7A is a block diagram of the circuit configuration of a chip with the negative voltage generating circuit of the invention.
Figure 7B:
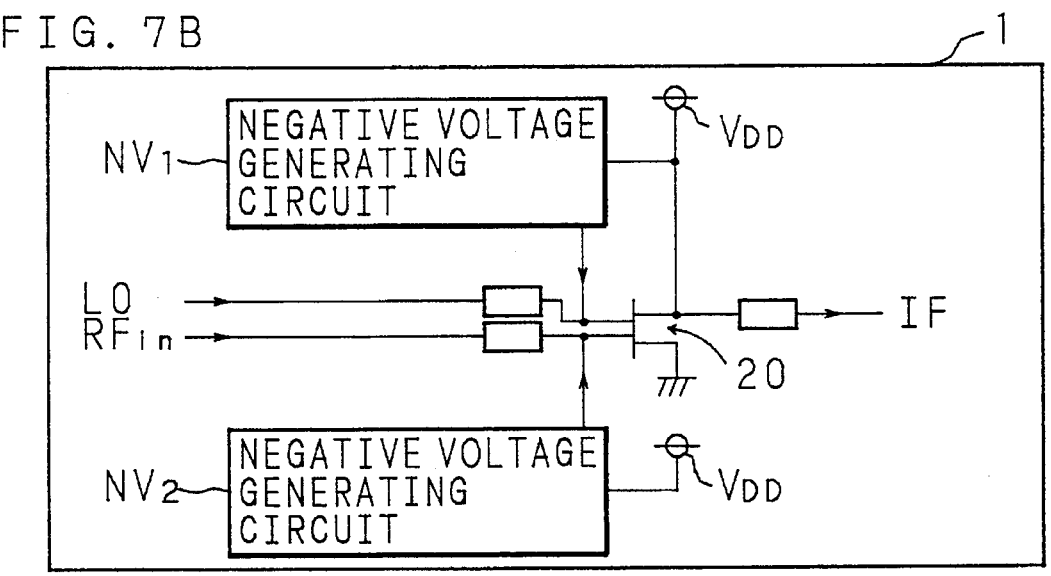
FIG. 7B is a block diagram of the circuit configuration of another chip containing the negative voltage generating circuit of the invention.
Figure 7C:
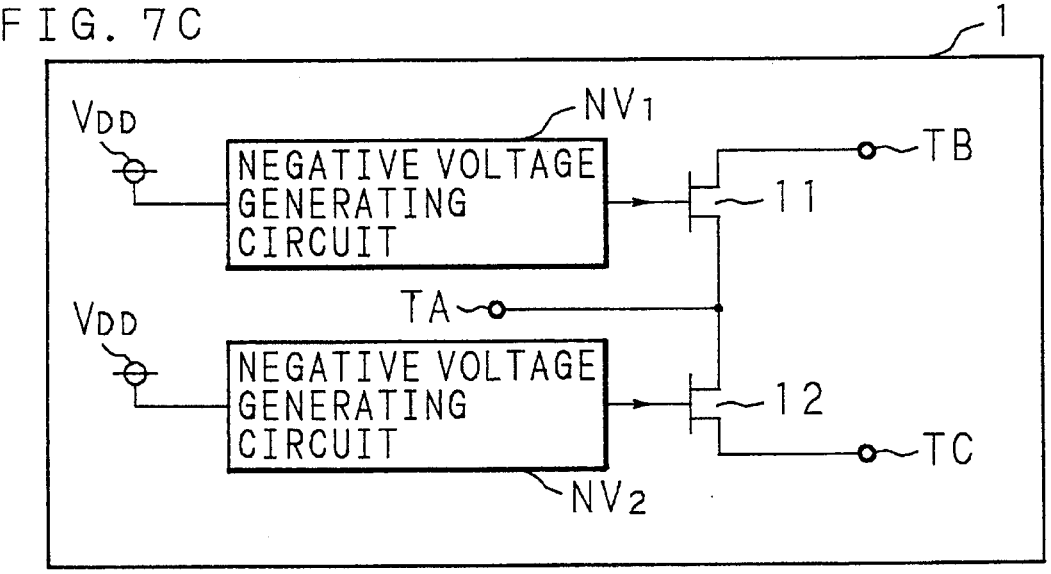
FIG. 7C is a block diagram of the circuit configuration of still another chip with the negative voltage generating circuit of the invention.

FIGS. 7A, 7B and 7C are block diagrams showing examples of the circuit configuration of a chip with the present negative voltage generating circuit of the invention together with another circuit.

The chip shown in FIG. 7A builds in a negative voltage generating circuit together and an amplifier. The source S of a FET 10 is grounded, and the gate G of the FET 10 is applied with negative voltage by the negative voltage generating circuit NV. The negative voltage generating circuit NV is applied with positive voltage V$_{DD}$, thereby generating the negative voltage in the above described manner. The drain D of the FET 10 is applied with the positive voltage V$_{DD}$. When a high-frequency signal RF$_{in}$ is supplied to the gate G of the FET 10, an amplified high-frequency signal RF$_{out}$ is outputted from the drain D.

The chip shown in FIG. 7B builds in two negative voltage generating circuits together and a mixer. One of the output terminals of a dual gate FET 20 is grounded, and the other output terminal thereof is applied with positive voltage V$_{DD}$. One of the input terminals of the dual gate FET 20 is applied with negative voltage outputted by one negative voltage generating circuit NV$_1$, and the other input terminal thereof is applied with negative voltage outputted by another negative voltage generating circuit $NV_2$. When a local oscillating frequency signal LO is supplied to one of the input terminals of the dual gate FET 20 and a high-frequency signal $RF_{in}$ is supplied to the other input terminal, an intermediate-frequency signal IF obtained through mixing these signals is outputted from one of the output terminals of the dual gate FET 20. The negative voltage generating circuits $NV_1$ and $NV_2$ are applied with the positive voltage $V_{DD}$, and generate different negative voltages by using different combined resistance values in the respective voltage controlling units therein in the above described manner.

The chip shown in FIG. 7C builds in two negative voltage generating circuits and two-output switching circuits. An FET 11 and an FET 12 are connected in series to each other, and the node between the FETs 11 and 12 is connected to an input terminal TA. One output terminal of the FET 11 that is not connected to the FET 12 is connected to a first output terminal TB, and one output terminal of the FET 12 that is not connected to the FET 11 is connected to a second output terminal TC. The gate of the FET 11 is applied with negative voltage generated by one negative voltage generating circuit, $NV_1$, and the gate of the FET 12 is applied with negative voltage generated by another negative voltage generating circuit $NV_2$. The negative voltage generating circuits $NV_1$ and $NV_2$ are applied with the positive voltage $V_{DD}$, and generate different negative voltages by using different combined resistance values in the respective voltage controlling units therein as described above.

When the gate of the FET 11 is applied with 0 V and the gate of the FET 12 is applied with a negative voltage below the pinch-off voltage thereof, the FET 11 is turned on and the FET 12 is turned off, thereby connecting the input terminal TA to the output terminal TB. When the gate of the FET 12 is applied with 0 V and the gate of the FET 11 is applied with a negative voltage below the pinch-off voltage thereof, the FET 12 is turned on and the FET 11 is turned off, thereby connecting the input terminal TA to the output terminal TC.

In this manner, when the negative voltage generating circuit is built in a chip, negative voltage can be generated within the chip by applying positive voltage to be used for another circuit in the chip. Therefore, the chip is required to be connected to a positive power supply alone.

The present, negative voltage generating circuit is used in a PHS device such as a portable telephone and a car telephone. Such a PHS device is desired to be miniaturized in the size and the weight and to consume a small power in terms of convenience. Negative voltage outputted by the negative voltage generating circuit of the invention can be supplied to the gate of an FET forming an amplifier, a mixer or switching elements in such a PHS device, and then, the power consumed by the system is made small when the negative voltage is appropriately controlled. Moreover, when the negative voltage generating circuit is formed in one chip together with an amplifier a mixer or switching elements as is shown in FIGS. 7A, 7B and 7C, and a supply voltage (for example, 1.2 V×3=3.6 V) for other elements of the PHS device such as an amplifier, a mixer and a switching element is commonly used, the system can be miniaturized in the size and the weight.

The application of the present negative voltage generating circuit, is not limited to a portable telephone and a car telephone. The negative voltage generating circuit can supply negative voltage to various FETs utilized in a digital telephone used in various countries, a device for the satellite broadcasting service such as a BS/CS, a radio LNA and the like.

Further, although a GaAs FET is used in the aforementioned embodiment, it is needless to say that any other FET that can be formed similarly to the GaAs FET can be used to attain the same effect, and hence, the invention is not limited to the GaAs FET. In addition, the embodiment is described by exemplifying a case where the present negative voltage generating circuit is built in a chip. It goes without saying, however, that the negative voltage generating circuit can be used without being built in a chip.

As described in detail above, since the oscillating unit in the negative voltage generating circuit of the invention is constructed of a ring oscillator using FETs, the capacitor for regulating the oscillation frequency is allowed to have an extremely small capacity, resulting in realizing the oscillating unit with an extremely small circuit pattern.

Moreover, since the FET in the charging pump forming the polarity inverting unit is turned on/off by a pulse signal having an extremely high frequency generated by the oscillating unit so as to charge the inverting capacitor and the smoothing capacitor, these capacitors are allowed to have extremely small capacities, resulting in also realizing the polarity inverting unit with an extremely small circuit pattern. In addition, no ripple is caused in the terminal voltage of the smoothing capacitor, thereby stabilizing the negative terminal voltage.

Furthermore, since the negative voltage is controlled by a resistance value that can be varied by controlling the FETs, the voltage controlling unit can be formed also with an extremely small circuit pattern. Accordingly, the negative voltage generating circuit, of the invention comprising the oscillating unit, the polarity inverting unit and the voltage controlling unit can generate a stable negative voltage and can be built in a chip with ease.

As this invention may be embodied in several forms without departing from the spirit of essential characteristics thereof the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A negative voltage generating circuit supplied with positive voltage for generating negative voltage, comprising:

an oscillating unit including a ring oscillator having a plurality of direct-coupled FET logic inverters, each of said inverters including a capacitor for providing an oscillation frequency; and a polarity inverting unit which includes a charging pump having an FET, an inverting capacitor and a smoothing capacitor and is electrically directly connected to said oscillating unit so as to receive said pulse signal, thereby charging said smoothing capacitor with negative voltage and outputting the charged negative voltage.

2. A negative voltage generating circuit according to claim 1, further comprising:

a voltage controlling unit including a control FET which operates in response to a control signal and receiving the negative voltage from said polarity inverting unit and controlling said negative voltage to be outputted in accordance with a resistance value of said voltage controlling unit varied by operating said control FET.

3. A negative voltage generating circuit according to claim 1, wherein said polarity inverting unit includes a diode electrically connected in parallel with said smoothing capacitor.

4. A negative voltage generating circuit according to claim 2, wherein said ring oscillator includes a plurality of direct-coupled FET logic inverters, and each of said inverters includes a capacitor for providing an oscillation frequency.

5. A negative voltage generating circuit according to claim 2, wherein said polarity inverting unit includes a diode electrically connected in parallel to said smoothing capacitor.

6. A negative voltage generating circuit according to claim 2, wherein said voltage controlling unit includes:

a series circuit of first FET and a first diode connected to a portion between a positive power supply and a positive electrode of said smoothing capacitor;

a series circuit of said control FET, a second diode and a second FET connected to a portion between the positive power supply and a negative electrode of said smoothing capacitor; and a terminal for outputting the negative voltage provided at a node between said second diode and said second FET.

7. A negative voltage generating circuit according to claim 6, wherein said first diode and said second diode have substantially equivalent IV characteristics.

8. A negative voltage generating circuit according to claim 6, wherein said first FET and said second FET have substantially equivalent IV characteristics.

9. A negative voltage generating circuit supplied with a positive voltage for generating a negative voltage, comprising:

an oscillating unit including a ring oscillator having an FET and a capacitor for outputting a pulse signal with a high frequency;

a polarity inverting unit which includes a charging pump having an FET, an inverting capacitor and a smoothing capacitor and receives said pulse signal, thereby charging said smoothing capacitor with negative voltage and outputting the charged negative voltage; and a voltage controlling unit including a control FET which operates in response to a control signal and receiving the negative voltage from said polarity inverting unit and controlling said negative voltage to be outputted in accordance with a resistance value of said voltage controlling unit varied by operating said control FET.

10. A negative voltage generating circuit according to claim 9, wherein said ring oscillator includes a plurality of direct-coupled FET logic inverters, and each of said inverters includes a capacitor for providing an oscillation frequency.

11. A negative voltage generating circuit according to claim 9, wherein said polarity inverting unit includes a diode electrically connected in parallel with said smoothing capacitor.

12. A negative voltage generating circuit according to claim 9, wherein said voltage controlling unit includes:

a series circuit of first FET and a first diode connected to a portion between a positive power supply and a positive electrode of said smoothing capacitor;

a series circuit of said control FET, a second diode and a second FET connected to a portion between the positive power supply and a negative electrode of said smoothing capacitor; and a terminal for outputting the negative voltage provided at a node between said second diode and said second FET.

13. A negative voltage generating circuit according to claim 12, wherein said first diode and said second diode have substantially equivalent IV characteristics.

14. A negative voltage generating circuit according to claim 12, wherein said first FET and said second FET have substantially equivalent IV characteristics.

* * * * *

UNITED STATES PATENT AND TRADEMARK OFFICE
CERTIFICATE OF CORRECTION

PATENT NO.:   5,614,814
DATED     :   March 25, 1997
INVENTOR(S):  NISHIDA et al.

It is certified that error appears in the above-identified patent and that said Letters Patent is hereby corrected as shown below:

On the title page item [54], the title, and col. 1:
Please delete "GENARATING" and add --GENERATING-- therefor.

Signed and Sealed this

Twelfth Day of August, 1997

Attest:

BRUCE LEHMAN

Attesting Officer        Commissioner of Patents and Trademarks